(12) United States Patent
Yi et al.

(10) Patent No.: US 9,663,738 B2
(45) Date of Patent: May 30, 2017

(54) PNEUMATIC CONVEYING DRYER FOR CARBON FUEL

(71) Applicants: SK Innovation Co., Ltd., Seoul (KR); SK Energy Co., Ltd., Seoul (KR)

(72) Inventors: Min Hoe Yi, Daejeon (KR); Gyoo Tae Kim, Daejeon (KR); Ju Hoe Kim, Daejeon (KR); Jin Hwan Bang, Daejeon (KR); Sung Kwang Lim, Daejeon (KR); Ho Jun Song, Daejeon (KR); Jae Wook Shin, Daejeon (KR)

(73) Assignees: SK Innovation Co., Ltd., Seoul (KR); SK Energy Co., Ltd., Seoul (KR)

( * ) Notice: Subject to any disclaimer, the term of this patent is extended or adjusted under 35 U.S.C. 154(b) by 41 days.

(21) Appl. No.: 14/655,628

(22) PCT Filed: Dec. 26, 2013

(86) PCT No.: PCT/KR2013/012227
§ 371 (c)(1),
(2) Date: Jun. 25, 2015

(87) PCT Pub. No.: WO2014/104764
PCT Pub. Date: Jul. 3, 2014

(65) Prior Publication Data
US 2016/0215228 A1    Jul. 28, 2016

(30) Foreign Application Priority Data

Dec. 26, 2012    (KR) .......................... 10-2012-0153327

(51) Int. Cl.
*C10L 9/00*    (2006.01)
*F26B 17/10*    (2006.01)
(Continued)

(52) U.S. Cl.
CPC ....... *C10L 9/00* (2013.01); *F15B 1/00* (2013.01); *F23G 5/027* (2013.01); *F23G 5/04* (2013.01);
(Continued)

(58) Field of Classification Search
CPC combination set(s) only.
See application file for complete search history.

(56) References Cited

U.S. PATENT DOCUMENTS

| | | |
|---|---|---|
| 5,720,116 A | 2/1998 | Yokomizo |
| 2011/0179713 A1 | 7/2011 | Pavone et al. |
| 2012/0055087 A1 | 3/2012 | Ulrich |

FOREIGN PATENT DOCUMENTS

| | | |
|---|---|---|
| AU | 540961 A1 | 10/1981 |
| AU | 2011241502 A1 | 12/2012 |

(Continued)

OTHER PUBLICATIONS

Guangwen, "Drying Equipment Design Manual"; Jul. 2009; pp. 168-169; China Machine Press; 1st Edition.

(Continued)

*Primary Examiner* — Ellen McAvoy
*Assistant Examiner* — Chantel Graham
(74) *Attorney, Agent, or Firm* — The Webb Law Firm

(57) ABSTRACT

Provided is a carbon fuel pneumatic dryer in which synthesis gas generated in a reactor is fed and cooled, including: a feeding part formed as a narrow pipe, via which synthesis gas and carbon fuel are fed; a drying part formed as a pipe having a larger diameter than the feeding part, in which the hot synthesis gas fed via the feeding part is cooled and the moisture content of the carbon fuel is lowered; and a conveying part formed as a pipe having a smaller diameter than the drying part such that the flow velocity of the synthesis gas and the carbon fuel having passed the drying part is increased, wherein the conveying part includes a bend (Continued)

so that the flow direction of the synthesis gas and the carbon fuel is changed.

9 Claims, 4 Drawing Sheets

(51) Int. Cl.
    *F23G 5/04*     (2006.01)
    *F23K 1/00*     (2006.01)
    *F23G 5/027*     (2006.01)
    *F15B 1/00*     (2006.01)
    *F16L 57/06*     (2006.01)
    *B65G 53/42*     (2006.01)

(52) U.S. Cl.
    CPC .............. *F23K 1/00* (2013.01); *F26B 17/105* (2013.01); *B65G 53/42* (2013.01); *C10J 2300/0909* (2013.01); *C10J 2300/1653* (2013.01); *C10L 2230/22* (2013.01); *C10L 2290/06* (2013.01); *C10L 2290/08* (2013.01); *C10L 2290/143* (2013.01); *C10L 2290/54* (2013.01); *C10L 2290/56* (2013.01); *F16L 57/06* (2013.01); *F23G 2209/262* (2013.01); *F23K 2201/30* (2013.01); *F23K 2203/101* (2013.01); *Y02E 20/18* (2013.01)

(56) References Cited

FOREIGN PATENT DOCUMENTS

| CN | 1083851 A | 3/1994 |
| CN | 201159581 Y | 12/2008 |
| CN | 201207913 Y | 3/2009 |
| CN | 102796545 A | 11/2012 |
| DE | 2512315 A1 | 2/1976 |
| JP | 07002950 B2 | 1/1995 |
| JP | 2000290671 A | 10/2000 |
| KR | 1019960014298 A | 5/1996 |
| KR | 20110139243 A | 12/2011 |
| KR | 20120056091 A | 6/2012 |
| WO | 2011/022767 A1 | 3/2011 |
| WO | 2012151625 A1 | 11/2012 |

OTHER PUBLICATIONS

Chen et al.; "Blast Furnace Fuel Injection"; Dec. 31, 1963; pp. 235-244; China Industrial Press. (English-language Abstract Attached).

PNEUMATIC CONVEYING DRYER FOR CARBON FUEL

CROSS-REFERENCE TO RELATED APPLICATIONS

This application is the United States national phase of International Application No. PCT/KR2013/012227 filed Dec. 26, 2013 and claims priority to Korean Patent Application No. 10-2012-0153327 filed Dec. 26, 2012, the disclosures of which are hereby incorporated in their entirety by reference.

TECHNICAL FIELD

The following disclosure relates to a carbon fuel pneumatic dryer, and in particular, to a carbon fuel pneumatic dryer capable of efficiently drying carbon fuel utilizing gasification synthesis gas and preventing material corrosion of the dryer.

BACKGROUND

Gasification is a technique to produce combustible gas fuel from solid fuel, which has a very long history and is still being developed. The fuel that human beings have used has changed from trees, coal, gas, oil, electricity and so on, some of which are still used for cooking and heating.

Carbon fuel (generally referred to as coal, divided into bituminous coal, sub bituminous coal, brown coal, anthracitic coal and the like) has been used for industrial purposes since the late eighteenth century, when the Industrial Revolution in Britain began. Historically, charcoal was replaced with coke as a reducing agent for the metal industry, or coal was used for city gas. Combustible gas fuel obtained as a result of gasifying carbon fuel is referred to as synthesis gas, which means that it is artificially produced, and is distinguished from natural gas which is natively embedded under the ground of the earth. Initially, synthesis gas has been used for city street lights, and then used for replacing solid fuel or producing chemical fuel. Recently, it is used for generating power or producing synthesis fuel.

In this connection, U.S. patent application Ser. No. 12/737,823 (filed on Aug. 13, 2009), entitled "Device for Gasification of Carbonaceous Fuels", discloses a device for gasification of carbonaceous fuels.

The gasification of carbon fuel produces synthesis gas consisting mainly of hydrogen and carbon monoxide by the oxidation reaction of carbon fuel while an oxidizing agent supplied to a reactor, and by the oxidation-reduction reaction of the carbon fuel with gas generated in the reactor such as carbon dioxide, steam and hydrogen.

The synthesis gas thus obtained is hot gas, and may be used for the integrated gasification combined cycle (IGCC) or the Fischer-Tropsch process, in which a heat exchanger for cooling the hot synthesis gas down to a certain temperature is essentially required.

Conventionally, since a separate, large heat exchanger has been employed in a gasification complex facility to cool hot synthesis gas generated in a reactor, there are problems in that the gasification complex facility increases in size, and installation cost is increased.

RELATED ART DOCUMENT

Patent Document

U.S. patent application Ser. No. 12/737,823 (filed on Aug. 13, 2009, entitled "Device for Gasification of Carbonaceous Fuels")

SUMMARY

An embodiment of the present invention is directed to providing a carbon fuel pneumatic dryer capable of cooling synthesis gas and drying carbon fuel simultaneously by circulating synthesis gas generated in a reactor so as to mix it with carbon fuel having much moisture without any separate heat exchanger.

Another embodiment of the present invention is directed to providing a carbon fuel pneumatic dryer capable of efficiently drying injected carbon fuel by evenly distributing it, and of preventing material erosion possibly caused by carbon fuel delivered at high speed when the liner velocity of synthesis gas is high.

In one general aspect, a carbon fuel pneumatic dryer, in which synthesis gas generated in a reactor is fed and cooled, includes: a feeding part formed as a narrow pipe, via which synthesis gas and carbon fuel are fed; a drying part formed as a pipe having a larger diameter than the feeding part, in which the hot synthesis gas fed via the feeding part is cooled and the moisture content of the carbon fuel is lowered; and a conveying part formed as a pipe having a smaller diameter than the drying part such that the flow velocity of the synthesis gas and the carbon fuel having passed the drying part is increased, wherein the conveying part includes a bend so that the flow direction of the synthesis gas and the carbon fuel is changed.

The feeding part or the drying part may include at least one nozzle unit that is installed on its outer circumferential surface in the tangential direction to inject carbon fuel therein so that the carbon fuel spirally flows in.

The nozzle unit may include two or more nozzles disposed on the outer circumferential surface of the feeding part or the drying part at different heights.

The nozzle unit may be inclined upwardly toward the conveying part.

A fuel injected through a nozzle included in the nozzle unit may have different characteristics from fuels injected through the other nozzles included in the nozzle unit.

The conveying part may include an anti-abrasion chamber having a bend protruding outwardly so that particles of the carbon fuel flowing therein rotate in one direction.

The anti-abrasion chamber may include a purge gas injection nozzle installed on its outer circumferential surface to inject purge gas therein.

One or more of the purge gas injection nozzle may be installed on the outer circumferential surface of the anti-abrasion chamber in the tangential direction.

The drying part may include a second nozzle unit such that fuel having different characteristic from the carbon fuel fed via the feeding part is injected into the drying part.

One or more of the second nozzle unit may be installed on the outer circumferential surface of the drying part in the tangential direction.

The moisture content of the carbon fuel fed into the drying part via the feeding part may be between 20 wt % and 60 wt %.

The moisture content of the carbon fuel discharged from the drying part may be between 1 wt % and 10 wt %.

The pressure of the synthesis gas fed into the drying part via the feeding part may be between 1 atm and 50 atm.

Other features and aspects will be apparent from the following detailed description, the drawings, and the claims.

DETAILED DESCRIPTION OF MAIN ELEMENTS

Figure 1:
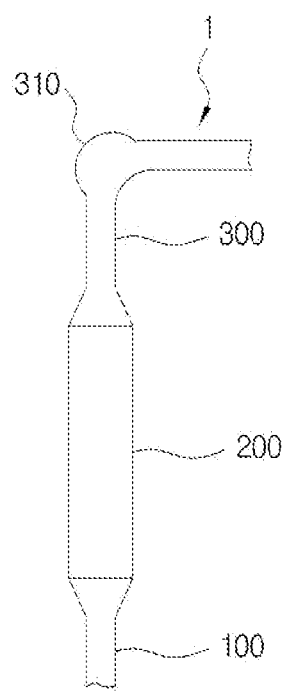
FIG. 1 is a schematic front view of a carbon fuel pneumatic dryer according to an embodiment of the present invention.

1: carbon fuel pneumatic dryer
100: feeding part
110: nozzle unit
200: drying part
300: conveying part
310: anti-abrasion chamber
320L purge gas injection nozzle

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

A carbon fuel pneumatic dryer 1 according to an embodiment of the present invention relates to a carbon fuel pneumatic dryer 1 into which a synthesis gas generated in a reactor is flown and cooled, mainly includes a feeding part 100, a drying part 200 and a conveying part 300, and is a type of pneumatic dryer.

The reactor is for generating a synthesis gas through a gasification process using carbon fuel. In this regard, the gasification means converting carbon fuel into fuel gas, in which the synthesis gas is generated by reacting the carbon fuel with steam using combustion heat of the carbon fuel.

Here, carbon fuel is coal material and includes low rank coal (high moisture coal), bituminous coal, sub bituminous coal, brown coal and the like. Further, the synthesis gas includes hydrogen, carbon monoxide, carbon dioxide, nitrogen, steam, methane and the like.

The synthesis gas discharged from the reactor may be fed into a gas turbine or the like to be used for generating power such as the integrated gasification combined cycle (IGCC) or may be used in the Fischer-Tropsch process in which liquid hydrocarbon is produced from synthesis gas with Fe or Co catalyst.

The synthesis gas generated in the reactor is hot gas having a high temperature from 500° C. to 1600° C., and may be discharged at from 1 atm to 50 atm. The ranges of the temperature and pressure of the synthesis gas discharged from the reactor are not limited to those described above but may be variously modified depending on the type and capacity of gasifiers employed as the reactor included in the present invention.

At first, the feeding part 100 is formed as a narrow pipe via which the synthesis gas discharged from the reactor and carbon fuel are fed.

The drying part 200 is formed as a pipe having a larger diameter than the feeding part 100 in which the hot synthesis gas fed via the feeding part 100 is cooled and the moisture content of the carbon fuel is reduced, enabling the carbon fuel to be evenly dispersed in the drying part 200 and to have long contact time with the synthesis gas.

The drying part 200 has a larger diameter than the feeding part 100, so that the carbon fuel and the synthesis gas may be mixed smoothly and evenly in the drying part 200. For example, the drying part 200 may be formed as a pipe having a diameter from 0.5 to 1.5 m and a length from 1 to 5 m.

That is, in the drying part 200, carbon fuel having much moisture content and hot synthesis gas are to be in contact with each other to exchange heat, as the moisture of the carbon fuel absorbs the heat of the synthesis gas to evaporate, the temperature of the synthesis gas is lowered and the moisture of the carbon fuel is reduced, and the dried carbon fuel is fed back to the reactor to be material of the synthesis gas.

Here, the moisture content of the carbon fuel fed into the drying part 200 is preferably from 20 wt % to 60 wt %. In the carbon fuel pneumatic dryer according to an embodiment of the present invention, cooling efficiency of synthesis gas is lowered if the moisture content is below 20 wt %, and manufacturing efficiency is lowered since the moisture content of the carbon fuel fed into the reactor is too high if the moisture content is above 60 wt %.

The feeding part 100 or the drying part 200 may include at least one nozzle unit 110 that is provided on the outer circumferential surface in the tangential direction and injects the carbon fuel so that the carbon fuel may spirally flow into the feeding part 100.

The nozzle unit 110 is installed on the outer circumferential surface in the tangential direction, the end via which the carbon fuel is sprayed is located inside the feeding part 100 or the drying part 200.

Figure 2:
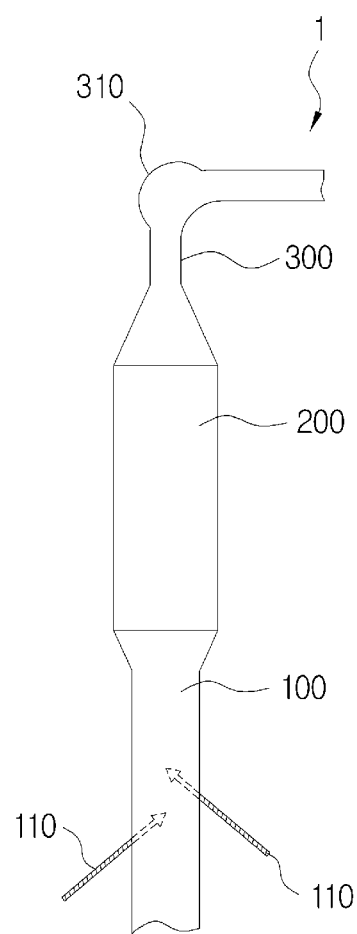
FIG. 2 is a schematic front view of a carbon fuel pneumatic dryer according to an embodiment of the present invention with a nozzle unit installed.

FIG. 2 is a perspective view schematically illustrating the installation direction of the nozzle unit 110 by which the carbon fuel is injected to the feeding part 100, in which the nozzle 110 may be inclined upwardly toward the drying part 200 so that the carbon fuel injected via the nozzle unit 110 flows more easily to the drying part 200.

Figure 3:
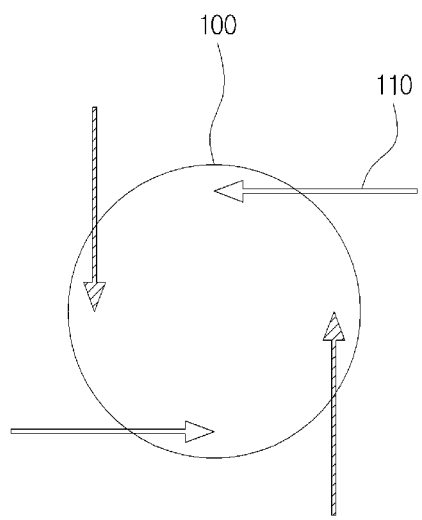
FIG. 3 is a schematic plan view of a feeding part of a carbon fuel pneumatic dryer according to an embodiment of the present invention.

FIG. 3 is a plan view schematically illustrating the installation direction of the nozzle unit 110 via which the carbon fuel is injected to the feeding part 100, in which two or more nozzles may be installed on the outer circumferential surface of the feeding part 100 spaced apart at a predetermine distance so that the spiral flow of the carbon fuel is smoothly generated in the feeding part 100.

Figure 5:
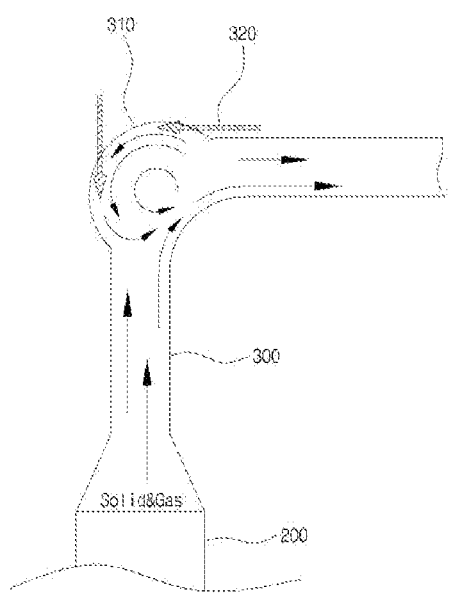
FIG. 5 is a schematic front view of a conveying part of a carbon fuel pneumatic dryer according to another embodiment of the present invention.

In other words, the carbon fuel pneumatic dryer 1 according to the embodiment of the present invention may include a nozzle unit inclined upwardly or downwardly with respect to the drying part, and especially if a nozzle unit inclined upwardly with respect to the drying part is used as shown in FIG. 5, injected matters such as carbon can be more evenly distributed.

With this configuration, in the carbon fuel pneumatic dryer 1 according to the embodiment of the present invention, the spiral flow of the carbon fuel is generated in the feeding part 100 by the multiple nozzles 110 having a plurality of nozzles symmetric to one another, so that the dispersion in the drying part 200 is facilitated, residence time is elongated and erosion on the inner surface caused by the particles of the carbon fuel may be reduced.

The conveying part 300 is formed as a pipe having a smaller diameter than the drying part 200 so as to increase the flow velocity of the synthesis gas and the carbon fuel having passed the drying part 200, and has a bend so as to change the flow direction of the synthesis gas and the carbon fuel to be discharged by a cyclone.

As shown in FIG. 1, in the carbon fuel pneumatic dryer 1 according to an embodiment of the present invention, the flow velocity of the carbon fuel and synthesis gas fed into the feeding part 100, which is a narrow pipe, is reduced when they pass the drying part 200 having a larger diameter, and again increased when they pass the conveying part 300 having a smaller diameter.

Here, since the conveying part 300 simply serves to deliver the carbon fuel and the synthesis gas, material cost and manufacturing cost may be reduced by configuring it with an axis pipe.

Figure 4:
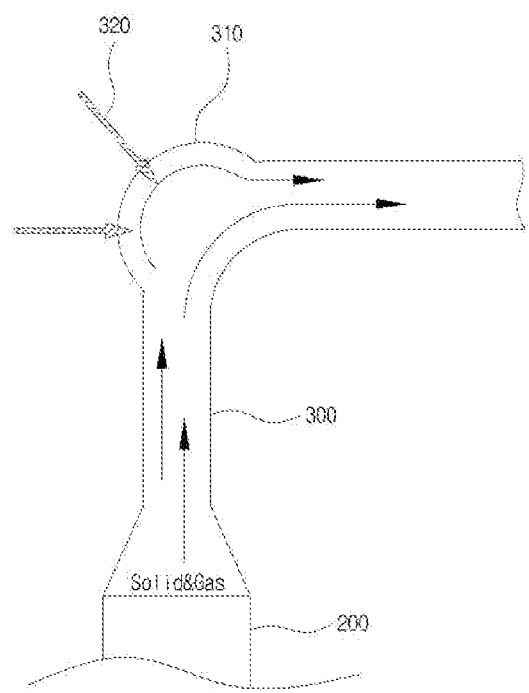
FIG. 4 is a schematic front view of a conveying part of a carbon fuel pneumatic dryer according to an embodiment of the present invention.

As shown in FIGS. 1 and 4, the conveying part 300 may include an anti-abrasion chamber 310 which has a bend protruding outwardly so that the particles of the carbon fuel flowing therein rotates in one direction.

In the carbon fuel pneumatic dryer 1 according to an embodiment of the present invention, the flow direction of the particles of the carbon fuel is changed to spiral flow, so that the high-speed particles of the carbon fuel passing through the conveying part 300 discharged from the drying part 200 is prevented from directly striking the bend on the inner wall of the conveying part 300, and thereby preventing material erosion.

The anti-abrasion chamber 310 may further include a purge gas injection nozzle 320 that is installed on the outer circumferential surface and injects purge gas. The flow direction of the high-speed particles of the carbon fuel and the synthesis gas flowing in the conveying part 300 may be changed according to the spraying direction of the purge gas.

In FIG. 4, two purge gas injection nozzles 320 are shown toward the center of the anti-abrasion chamber 310, by which the carbon fuel and the synthesis gas delivered from the drying part 200 may be discharged to the next process or by a cyclone while being bent at 90 degree.

Accordingly, the high-speed particle of the carbon fuel do not strike the inner wall but spirally flow so as to be discharged to the outside, such that corrosion of the conveying part 300 may be minimized.

In addition, at least one purge gas injection nozzle 320 may be installed on the anti-abrasion chamber 310 in the tangential direction as shown in FIG. 5. In this case, in the anti-abrasion chamber 310, a rotating ball serves as a cushion which is formed by the one direction rotation of the particles of the carbon fuel resulting from a suitable gas purge, such that the particles of the carbon fuel do not directly strike the inner wall of the bend but the flow direction may be smoothly changed to be discharged to the outside.

In other words, the anti-abrasion chamber 310 creates a rotating ball since the particles of the carbon fuel rotate therein in one direction, which serves as a cushion so that the carbon fuel delivered at a high speed from the drying part 200 does not directly strike the bend on the inner wall of conveying part 300. In addition, the particles of the carbon fuel are discharged after they rotate at an appropriate speed in the anti-abrasion chamber 310, so that they are not overly dried.

Further, as shown in FIG. 6, in the carbon fuel pneumatic dryer 1, multiple nozzles 110 may be installed in the drying part 200 at different heights such that fuels having different characteristics may be injected to the drying part 200.

That is, in the carbon fuel pneumatic dryer 1 according to the embodiment of the present invent, a fuel injected through a nozzle included in the nozzle unit 110 may have different characteristics from fuels injected through the other nozzles included in the nozzle unit 110.

With this configuration, when two or more kinds of fuel are mixed and used in combustion or gasification, the other kind of fuel is injected via the nozzle part 110, so that the carbon fuel pneumatic dryer 1 according to the embodiment of the present invention may dry each of the two kinds of fuel to a desired moisture content in the drying part 200 and may mix them well in the drying part 200 without using any mixing apparatus.

As an example, in the carbon fuel pneumatic dryer according to an embodiment of the present invention, biomass having high moisture content and low heat amount such as agricultural waste, lumber, or sewage slurry is injected via the a nozzle 110, and then carbon fuel having low moisture content and high heat amount such as coal is injected via one of the nozzles 110, so that the carbon fuel compensates for the low heat amount of the biomass and moisture is removed, thereby making it suitable for combustion or gasification.

Further, as shown in FIG. 1, the carbon fuel pneumatic dryer 1 according to an embodiment of the present invention may include a flow path in which the carbon fuel and synthesis gas are fed from the bottom and discharged via the top.

That is, the synthesis gas and carbon fuel are moved upwardly of the dryer by the pressure of the fed synthesis gas and exchanges heat to be discharged.

Here, in the carbon fuel pneumatic dryer 1 according to the embodiment, when carbon fuel having granularity of 2 mm or less is fed, even if the fluid pressure of the synthesis gas is low, it may be easily discharged upwardly.

In addition, in the carbon fuel pneumatic dryer 1 according to an embodiment of the present invention, carbon fuel and synthesis gas may be fed from the top and discharged via the bottom.

When the synthesis gas is discharged via the top of a reactor, in the carbon fuel pneumatic dryer 1 according to the embodiment, by feeding the synthesis gas via the top, a reactor and simple flow path design may be achieved, so that manufacturing cost for gasification complex facility is reduced and space occupation is improved.

Therefore, in the carbon fuel pneumatic dryer 1 according to the embodiment, by feeding carbon fuel having much moisture and hot synthesis gas, the synthesis gas may be cooled without a larger heat exchanger for cooling the synthesis gas of high temperature. Further, since an additional dryer for adjusting the moisture of carbon fuel fed in a reactor is not necessary, installation is simple and installation cost is reduced.

In the carbon fuel pneumatic dryer 1 according to the embodiment, in order to improve efficiency in the later processes using synthesis gas such as the Fischer-Tropsch process, the temperature of the synthesis gas discharged from the drying part 200 is preferably between 150° C. and 300° C. Further, the carbon fuel having passed the drying part 200 has a moisture content preferably between 1 wt % and 10 wt % in order to improve production efficiency of the synthesis gas in a reactor.

The advantage of the carbon fuel pneumatic dryer 1 according to the embodiments of the present invention lies in that cooling of synthesis gas and drying of carbon fuel can be simultaneously performed by circulating hot synthesis gas generated in a reactor to mix it with carbon fuel having much moisture in the drying part 200, without an additional heat exchanger.

Further, in the carbon fuel pneumatic dryer 1 according to the embodiments of the present invention, hot synthesis gas and carbon fuel can be smoothly and evenly mixed by installing a nozzle unit on the outer circumferential surface of the feeding part 100 having a pipe shape in the tangential direction so that the carbon fuel spirally flows into the feeding part 100.

Moreover, in the carbon fuel pneumatic dryer 1 according to the embodiments of the present invention, an appropriate drying rate of carbon fuel can be obtained and volatile matter of carbon fuel during the drying process can be suppressed in a such manner that the carbon fuel fed in the drying part 200 having a larger diameter are dispersed over a wider space and have a longer contact time with hot synthesis gas fed therein.

Further, in the carbon fuel pneumatic dryer 1 according to the embodiments of the present invention, material erosion on the inner wall of the conveying part 300 possibly caused by carbon fuel can be reduced by providing a purge gas injection unit at a bend of the conveying part 300 to cause vortex flow in the carbon fuel moving fast when the linear velocity of the synthesis gas is high.

Additionally, in the carbon fuel pneumatic dryer 1 according to the embodiments of the present invention, the target drying rate of secondly injected fuel can be obtained, and two kinds of fuel can be efficiently mixed in the drying part 200 without requiring a separate mixer by injecting fuel having different moisture content or granularity.

The present invention is not limited to the above-mentioned exemplary embodiments but may be variously applied, and may be variously modified by those skilled in the art to which the present invention pertains without departing from the gist of the present invention claimed in the claims.

What is claimed is:

1. A carbon fuel pneumatic dryer in which synthesis gas generated in a reactor is fed from a bottom and cooled, comprising:
   a feeding part formed as a narrow pipe, via which synthesis gas and carbon fuel are fed;
   a drying part formed as a pipe having a larger diameter than the feeding part, in which the hot synthesis gas fed via the feeding part is cooled and the moisture content of the carbon fuel is lowered; and
   a conveying part formed as a pipe having a smaller diameter than the drying part such that the flow velocity of the synthesis gas and the carbon fuel having passed the drying part is increased, wherein the conveying part includes a bend so that the flow direction of the synthesis gas and the carbon fuel is changed;
   wherein the feeding part or the drying part includes a plurality of nozzle units that are installed on its outer circumferential surface in the tangential direction and are upwardly inclined toward the drying part to inject carbon fuel therein.

2. The dryer according to claim 1, wherein the nozzle unit includes two or more nozzles disposed on the outer circumferential surface of the feeding part or the drying part at differential heights.

3. The dryer according to claim 2, wherein a fuel injected through a nozzle included in the nozzle unit has different characteristics from fuels injected through the other nozzles included in the nozzle unit.

4. The dryer according to claim 1, wherein the conveying part includes an anti-abrasion chamber having a bend protruding outwardly so that particles of the carbon fuel flowing therein rotate in one direction.

5. The dryer according to claim 4, wherein the anti-abrasion chamber includes a purge gas injection nozzle installed on its outer circumferential surface to inject purge gas therein.

6. The dryer according to claim 5, wherein one or more of the purge gas injection nozzle is installed on the outer circumferential surface of the anti-abrasion chamber in the tangential direction.

7. The dryer according to claim 1, wherein the moisture content of the carbon fuel fed into the drying part via the feeding part is between 20 wt % and 60 wt %.

8. The dryer according to claim 7, wherein the moisture content of the carbon fuel discharged from the drying part is between 1 wt % and 10 wt %.

9. The dryer according to claim 1, wherein the pressure of the synthesis gas fed into the drying part via the feeding part is between 1 atm and 50 atm.

* * * * *